Nov. 12, 1968　　　B. D. TONJES　　　3,410,408
PULSATORY SCREENING DEVICE

Filed April 7, 1966　　　3 Sheets-Sheet 1

INVENTOR.
BURL D. TONJES
BY
ATTORNEY

Nov. 12, 1968   B. D. TONJES   3,410,408
PULSATORY SCREENING DEVICE
Filed April 7, 1966   3 Sheets-Sheet 2

INVENTOR.
BURL D. TONJES
BY
ATTORNEY

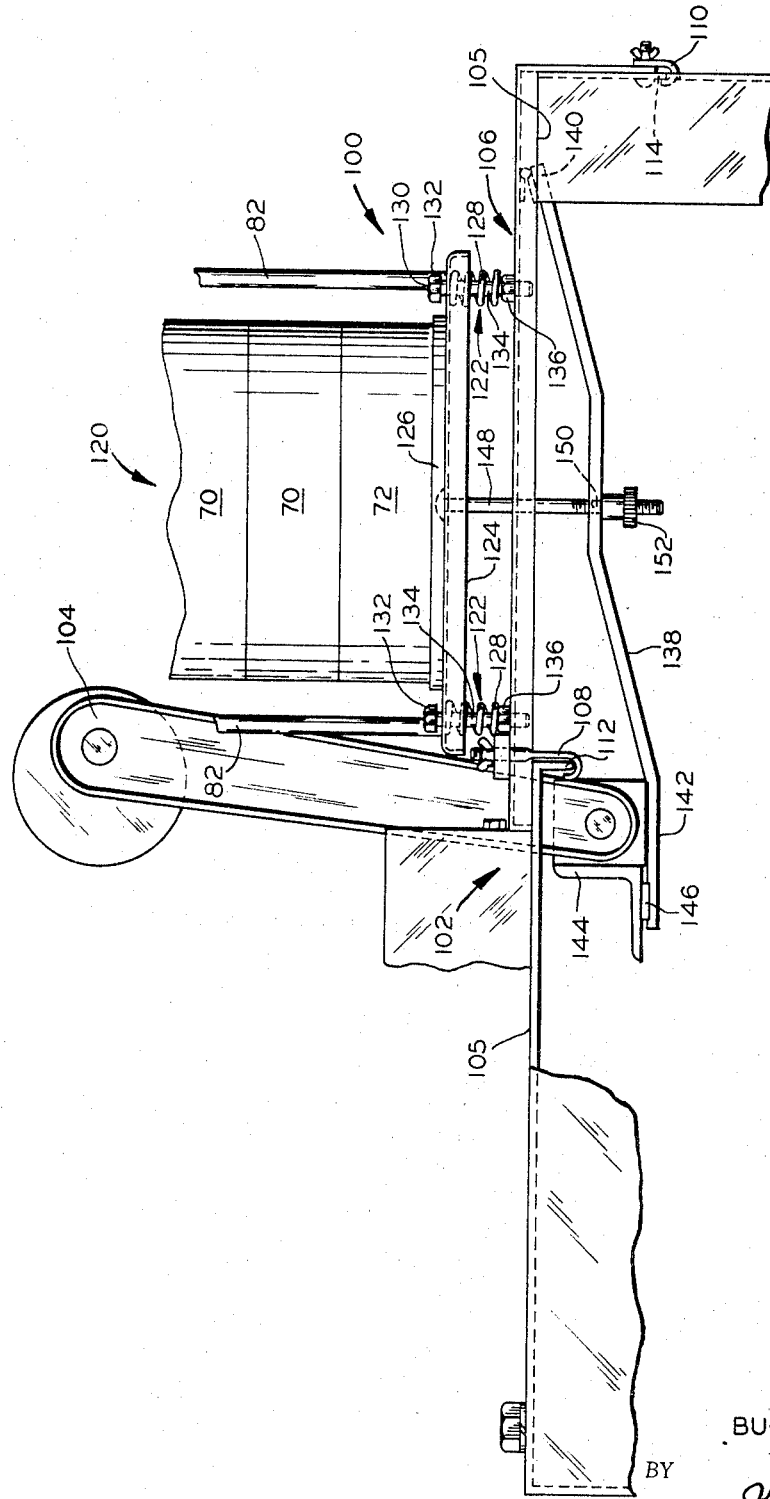

United States Patent Office 3,410,408
Patented Nov. 12, 1968

3,410,408
PULSATORY SCREENING DEVICE
Burl D. Tonjes, Malinta, Ohio, assignor to Gilson Screen Company, Malinta, Ohio, a partnership
Filed Apr. 7, 1966, Ser. No. 540,980
10 Claims. (Cl. 209—237)

ABSTRACT OF THE DISCLOSURE

A device for supporting and releasably clamping a stack of testing or sorting screens, having a transparent lid, between a pulsating member and a stationary member, comprising: springs between said members to permit vibration of the device, and an adjustable pivoted link between said members for (a) vibrating the device and including an abutment means for positively stopping the device during each upward vibratory movement, and (b) for varying the amplitude and intensity of said vibrations. The stationary and pulsatory members may be parts of another and larger screening device to which the present device may readily be attached.

Background of the invention

It has been a continuing problem in the art of separating various sized particles by sifting, that the screens become clogged with particles larger than their pores which clogging results in slow or improper sifting. In a screening apparatus having a sifting screen carrying particles to be sorted, which screen is subjected to a vibratory, gyratory, or the like cyclic motion providing at least some vertical travel during a portion of the cycle, the screen and the particles thereon may be parted from each other most readily at or slightly after the screen reaches its apogee and begins its downward movement. If the speed of the upward traverse of the screen is increased and/or the upward traverse is stopped more abruptly, the tendency of the screen and the particles thereon to part company is also increased. The sifting action will be enhanced if the screen and the particles are moved laterally with respect to each other while they are not in contact, which movement reduces the chances of the particles striking the same portion of the screen in the same manner as in the preceding cycle. When various batches of various materials are to be sorted, the optimum results may not always be obtained for each batch under the same cyclic movement as any other batch. Therefore in a screening device that must function under a range of conditions, the intensity and the amplitude of these cyclic forces preferably are readily adjustable.

Summary of the invention

Generally speaking, the screening device of this invention comprises a stationary member, a vibrating member, a pulsatory screening member, and an adjustable link means between said screening member and said stationary member for varying the amplitude of the vibrations of said screening member with respect to said vibrating member. The stationary member and vibrating member may be a base frame and a pulse generating source mounted thereon solely for the screening device of this invention, or they may be the corresponding parts or members of another screening device, (such as shown in S. J. Gilson U.S. Patent No. 2,358,453 issued Sept. 19, 1944, or Tonjes et al. U.S. Patent No. 3,098,037 issued July 16, 1963) to which the device of this invention may be attached. The pulse generating source or vibrating member may be either an oscillator, vibrator, gyrator, or the like, so long as the force applied to the pulsatory screening member results in a cyclic motion with at least some vertical movement being imparted thereto.

The pulsatory screening member may comprise a platform for firmly holding a tray with a screen bottom, or a column of such trays or sieves, containing a mass of particles of various sizes to be sorted or sifted. This pulsatory platform is so supported to either the stationary or the vibrating member, that it is permitted resilient vertical downward movement but is positively stopped during its vertical upward movement. This abrupt stopping of its upward movement is controlled by the adjustable link means, which also controls the amplitude and intensity of the relative movement of the pulsatory platform. This abrupt stopping of the upward travel of the platform and the screening tray held thereon, causes the particles, gravitationally held on the screen, to continue their upward travel and part company with the screen due to their upward inertia. Thereby the screen is cleared and the orientation of the particles is changed, with respect to each other and with respect to the screen, so that when the particles fall back upon the resiliently supported screen there is a greater likelihood of the undersize particles passing through the screen. The amplitude and intensity of the irregular motion imparted to the pulsatory platform may be readily regulated during the sifting process, or between batches, in order to maintain optimum efficiency by adjusting the aforementioned link means to meet existing conditions. Furthermore, this link means may be connected to the pulsatory platform in an off-center position to produce an unbalance which causes the platform to wobble during operation.

Accordingly it is an object of this invention to produce a simple, efficient, effective, and economic pulsatory screening device in which the vertical movement is abruptly halted during a portion of the pulsatory cycle.

It is another object of this invention to produce a screening device in which the intensity and magnitude of these vibratory pulses may be readily adjusted or changed.

It is still another object of this invention to produce a pulsatory screening device which may be attached to vibratory sources such as another screening apparatus or be driven by its own pulse generating source.

A further object of this invention is to produce a screening device with a means for visually checking the progress of the sorting process, and with a means by which a column of screening members may be readily inserted or removed.

Brief description of the views

The above mentioned features and other objects of this invention and the manner of obtaining them will become more apparent and the invention itself will be understood best by reference to the following description of an embodiment of the invention taken in conjunction with the accompanying drawings, wherein:

FIG. 4 is a view of one side of another embodiment of this invention shown attached to the stationary member of another type of screening device and on which the vibrations of the pulsatory platform are transmitted through the adjustable link means.

Detailed description of preferred embodiments

Figure 1:
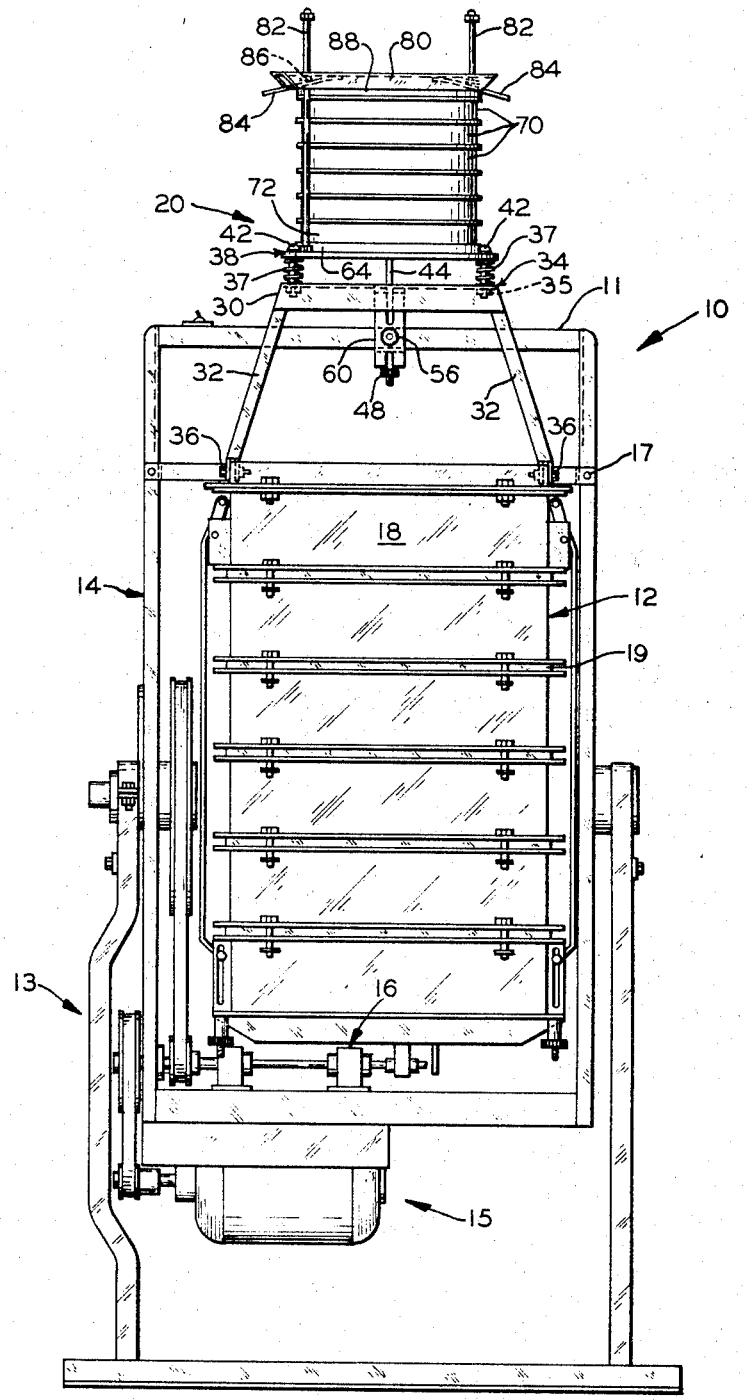
FIG. 1 is a view of one side of the pulsatory screening device of one embodiment of this invention, shown attached to a vibrating member of another screen device which transmits impulses through the support means of the pulsatory platform.
Figure 2:
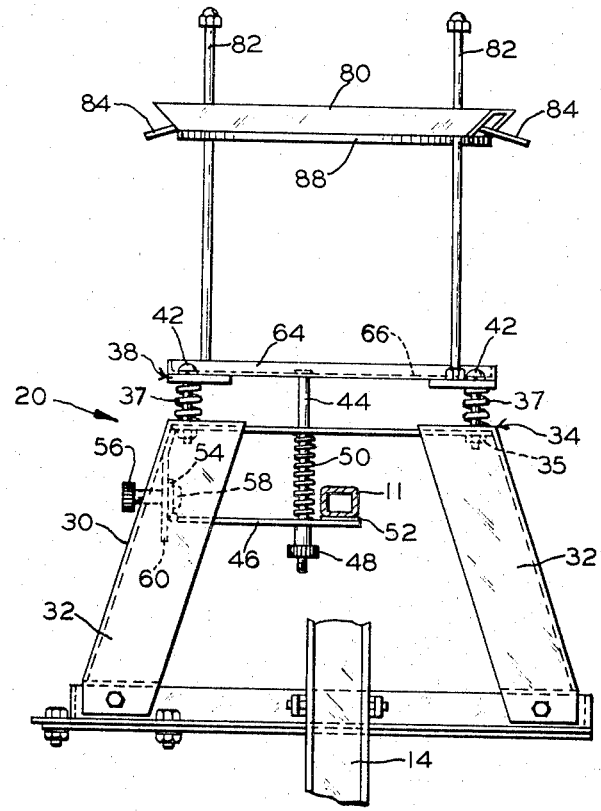
FIG. 2 is a view of another side of the embodiment shown in FIG. 1 with a part broken away, showing the adjustable connecting link means.
Figure 3:
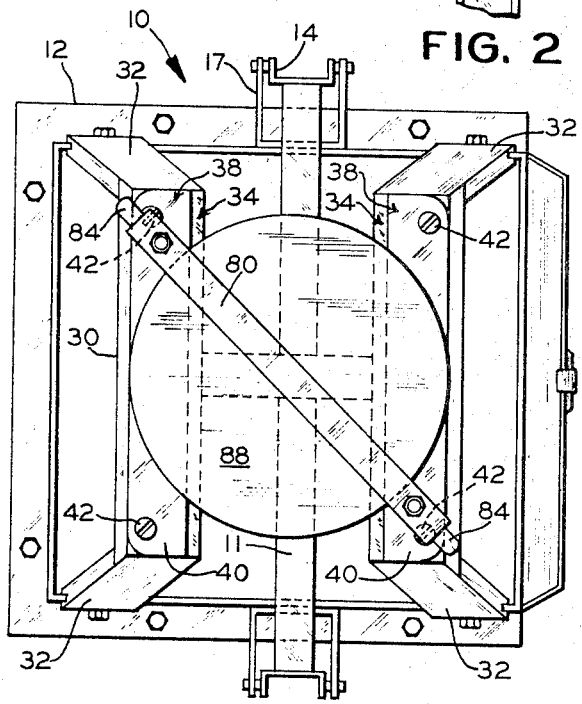
FIG. 3 is a top plan view of the embodiment shown in FIG. 1, showing a clear plastic sieve cover for the sieves.

Referring to the drawings, FIG. 1 shows a type of screening apparatus 10 shown in the above mentioned Tonjes et al. Patent No. 3,098,037, having non-vibrating members 11 and 14 and a vibratory screening assembly 12 to which the pulsatory screening device 20 of this invention may be attached. The screening apparatus 10 has a stationary angular base frame 13 upon which may be mounted a rockable non-vibrating generally vertically disposed rectangular frame 14, which at its lower end rigidly supports a vibration generating source 15 connected through an eccentric 16 to the vibrating assembly 12, which assembly is slidably connected adjacent the upper end of the non-vibrating frame 14 by outwardly extending yokes 17. This vibrating assembly 12 may contain a stack of spacers 18 between gasket edged screens 19.

The support frame structure 30 of the pulsatory screening device 20 may be generally rectangular in shape having four leg members 32 each depending from a corner of a planar support surface 34. Adjacent the lower ends of the leg members 32, means are provided, such as bolts 36, for attaching the support frame 30 to a vibration generating assembly 12 of another screening device 10 or any other prime vibrating source. Located adjacent each of the four corners of the planar support surface 34 may be disposed vertical support means, such as helical spring 37, for resiliently supporting a pulsatory platform 38 which may have parallel brackets 40 rigidly affixed to the platform as by welding to the bottom thereof. The brackets 40 may contain holes coincident with the four helical springs 37 and corresponding holes 35 in the support surface 34, through which bolt means 42 may be inserted to hold the otherwise resiliently supported pulsatory platform 38 in general alignment with the support frame 30. The bolt means 42 may be used to adjust the effective length of the support springs 37, such as when the platform 38 is not situated in a level position.

A generally vertical one-way connecting link 44, which may be a threaded rod or carriage bolt, is attached to the pulsatory platform 38 and depends from this platform to beyond the far side of the non-vibrating frame member 11 a sufficient distance to accommodate an abutment bar 46 and an adjusting nut 48 on said far side thereof. This link 44 also may be off-center with respect to the corner springs 37, both to avoid the central stationary member 11 as well as to effect a slight lateral movement to the screen attachment 20. The connecting link 44 may be surrounded by a relatively mild helical spring 50 to hold resiliently the generally horizontal abutment bar 46 against the adjusting nut 48 during the pulsating cycle. The abutment bar 46 lies between the adjusting nut 48 and the non-vibrating member 11. The bar 46 may be forked or apertured at or near one end so as to contain the connecting link 44. The abutting side of the end of the bar 46 may be padded with sound deadening material, such as a felt or rubber pad 52. The other end of bar 46 may be hingedly attached to an upright hinge member 54 which may be slidably secured by a knurled nut 56 and bolt 58 to be a slotted vertically depending flange member 60 (see FIG. 1 also) affixed to the upper portion of the support frame 30. This structure enables an operator to adjustably maintain the abutment bar 46 in a generally horizontal position even though the initial location of the non-vibrating member 11 may vary, such as due to different height spacers 18 and intermediate screens 19, or the omission of one or more screens 19.

The platform 38 may be in the form of a shallow tray or circular pan having an upright rim 64. A resilient pad 66 may be placed in the shallow tray for supporting a column of screening containers 70 having upright housing walls with sieve bottoms. The lowermost screening container may, in lieu of a sieve, have a solid bottom thereby forming a residue tray 72. The column of screening containers 70 and 72 may be removably held upon a platform 38 and pad 66 by a retaining bar 80 which may be movably secured to a pair of vertical rods 82 attached to the vibratory platform 38 and extending beyond the uppermost screening container 70. The means for movably securing the retaining bar 80 to the upright rods 82 may be a jam lock clip means at each end of the retaining bar 80. This means may comprise a lever 84 with an aperture near one end to slidably receive one of the upright rods 82. Intermediate the aperture and the other end of the lever 84 may be a spring for holding the lever 84 at an acute angle to the rod 82, or the lever 84 itself may be a leaf spring. The aperture is fitted to the rod 82 so that, when the lever 84 is held at an acute angle, opposed edges of the aperture in the lever 84 angularly grip the rod and thereby firmly hold the retaining bar 80 in position against the column of screening containers 70. Moving the levers 84 to an approximate perpendicular position with respect to the rod 82, releases the grip of the levers 84 on the rods 82, so that the bar 80 may be moved vertically on the rods 82 away from the adjacent top container permitting the removal of the column of screening containers 70. A sieve cover 88 of transparent plastic for covering the uppermost screening container 70 may be attached to the retaining bar 80 for the purpose of preventing the escape of dust during the operating cycle and for permitting observation of the progress of the sorting process.

The pulsatory screening device 100 shown in FIG. 4 is an attachment which may be affixed over the opening in the top of another vibratory screening apparatus 102 (such as of the type shown in the above mentioned Gilson Patent No. 2,358,453) and adjacent its vibration generation unit 104. This device 100 includes a support frame means 106 which may be removably attached to the stationary top 105 of the screening apparatus 102 by hooked bolt means 108 and hooked tab means 110 for engaging the stationary depending edges 112 and 114 adjacent the top 105.

The pulsatory screening device 100 has a pulsatory screening member 120 supported upon spring means 122 carried by the support frame means 106. The pulsatory assembly 120 may include a column of screening containers 70 and 72 removably attached to the pulsatory platform 124 of the member 120. A resilent pad 126 may be placed between the platform 124 and its first adjacent screen container 72.

The spring means 122 for supporting the pulsatory platform 124 may comprise vertically disposed helical springs 128 at the corners of the pulsatory platform 124 and held in position by threaded bolt means 130 having bolt heads 132 above the platform 124 and the bolt shanks 134 slidable in holes in the platform 124 and extending downwardly into threaded holes in support frame 106 where they may be locked in place by lock nuts 136. The heads 132 of the bolt means 130 function as positive stop means to limit the upper travel of the pulsatory platform 124.

A one-way connecting link means connects the pulsatory platform 124 to the vibration generating unit 104, which link means may include an abutment bar 138 that extends beneath the pulsatory platform 124. One end 140 of this bar 138 is hingedly attached to the underside of the support frame 106, and its other end 142 abuts the underside of the depending vibratory member 144 of the vibration generating unit 104. This vibrating member 144 then pushes downwardly on the end 142 to impart movement through the bar 138 and link means 148 to vribrate the screening means 120. A noise deadening pad 146 may be placed between these abutting surfaces and attached to one of them. The connecting link means 148 may comprise a partially threaded bolt with its unthreaded end attached to the pulsatory platform 124 and its threaded end extending downwardly through a loosely fitted hole 150 in the abutment bar 138. A threaded adjusting knob 152 may be used on this threaded end beneath the abutment bar 138 to hold adjustably the free end 142 of the bar 138 against the vibratory member 144 for at least a portion of each of its vibratory cycles. This adjusting knob 152 may also serve to jointly vary the compression of the support springs 128, thus varying their upward thrusting force and the amplitude of vibration of the screening member or device 120. This adjustment may be made either when the device is stopped or during its operation.

Operation

After the pulsatory screening device 20 or 100 has been properly attached to a stationary support 11 or 105 and to a vibration generating source 12 or 104, the residue tray 72 and the screening containers 70 having the selected grid sizes are placed in a column or stack upon the resilient pad 66 or 126 of vibrating platform 38 or 124. The particles to be sorted are then fed upon the uppermost screen at which time the transparent sieve cover 88 may be pressed tightly against the uppermost screening container 70, where it is rigidly held by retaining bar 80 through self-locking jam clip levers 84. The vibration generating source 15 or 104 may be energized causing vibrations to be transmitted to the pulsatory platform 38 or 124 and to the screening containers 70, whereby the particles smaller than the screen pores are induced to pass efficiently through successively finer grading screens until they are finally held upon a screen having pores too small to permit passage, or if not so held then passing into the residue tray 72. The adjusting nut 48 or 152 beneath the connecting link means 44 or 148 may be tightened or loosened to vary the pre-compression of springs 37 or 128 supporting the pulsatory platform 38 or 124, and thereby vary the resultant pulsations in their amplitude, intensity and/or form.

While there is described above the observed principles of this invention in connection with specific apparatus, it is to be clearly understood that there may be many unobserved side effects which contribute substantially to the efficiency of this device and that this description is made only by way of example and not as a limitation to the scope of this invention.

What is claimed is:
1. A sorting device comprising:
 (A) a stationary member,
 (B) a vibrating member,
 (C) means for vibrating said vibrating member,
 (D) a screening means resiliently attached to one of said members,
 (E) means for connecting said screening means to said vibrating member to vibrate said screening means, and
 (F) a one-way link means between said screening means and said stationary member for varying the amplitude of vibration of said screening means relative to said vibrating member, said link means including:
  (a) an abutment bar pivotally attached to one of said members and abutting the other of said members, and
  (b) a link connected between said screening means and said abutment bar.

2. A sorting device according to claim 1 wherein said abutment bar stops the motion of said screening means by abutment against said stationary member once each cycle of vibration of said vibrating member.
3. A device according to claim 2 wherein said link means includes cushion means at said abutment.
4. A device according to claim 1 wherein said screening means includes: a platform, and a sifting means removably attached to said platform.
5. A device according to claim 1 wherein said one member is said stationary member.
6. A device according to claim 1 wherein said one member is said vibrating member.
7. A device according to claim 1 wherein said screening means includes a platform resiliently supported on one of said members, and at least one screening element secured to said platform.
8. A device according to claim 7 wherein the uppermost screening element has a removable transparent cover.
9. A sorting device comprising:
 (A) a stationary frame member of another sorting device,
 (B) a vibrating member of said other sorting device,
 (C) means for vibrating said vibrating member,
 (D) a screening means resiliently attached to one of said members,
 (E) means for connecting said screening means to said vibrating member to vibrate said screening means,
 (F) a one-way link means between said screening means and said stationary member for varying the amplitude of vibration of said screening means relative to that of said vibrating member.

10. A sorting device according to claim 9 including means for removably attaching said device to said other sorting device.

References Cited

UNITED STATES PATENTS

| | | | |
|---|---|---|---|
| 417,907 | 12/1889 | Coplen | 209—349 |
| 422,043 | 2/1890 | Stone | 209—365.2 X |
| 441,903 | 12/1890 | Scholl | 209—365 X |
| 802,563 | 10/1905 | Graham | 209—319 |
| 1,291,371 | 1/1919 | Bell | 209—237 |
| 1,632,927 | 6/1927 | Shackelford | 209—347 |
| 2,358,453 | 9/1944 | Gilson | 209—237 X |
| 3,095,747 | 7/1963 | Morris | 209—365 X |
| 3,098,037 | 7/1963 | Tonjes et al. | 209—237 X |
| 3,109,808 | 11/1963 | Greenwell | 209—239 X |

FOREIGN PATENTS

| | | |
|---|---|---|
| 300,007 | 11/1928 | Great Britain. |
| 402,402 | 11/1933 | Great Britain. |

OTHER REFERENCES

"Allen-Bradley Sonic Sifter," pub. 6801, 8/1965, Allen-Bradley Co., Milwaukee, Wis., 8 pps.

HARRY B. THORNTON, *Primary Examiner.*

TIM R. MILES, *Assistant Examiner.*